United States Patent
Osaka

(10) Patent No.: US 9,342,067 B2
(45) Date of Patent: May 17, 2016

(54) ROBOT APPARATUS, ROBOT CONTROL METHOD, PROGRAM, AND RECORDING MEDIUM

(71) Applicant: CANON KABUSHIKI KAISHA, Tokyo (JP)

(72) Inventor: Tsutomu Osaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 14/030,798

(22) Filed: Sep. 18, 2013

(65) Prior Publication Data
US 2014/0084840 A1    Mar. 27, 2014

(30) Foreign Application Priority Data

Sep. 25, 2012  (JP) ................................ 2012-210917

(51) Int. Cl.
G05B 19/404    (2006.01)

(52) U.S. Cl.
CPC .... *G05B 19/404* (2013.01); *G05B 2219/37159* (2013.01); *G05B 2219/37356* (2013.01); *G05B 2219/41059* (2013.01)

(58) Field of Classification Search
CPC .................................................... G05B 19/404
USPC ................................................ 318/560, 632
See application file for complete search history.

(56) References Cited

U.S. PATENT DOCUMENTS

| | | | | |
|---|---|---|---|---|
| 4,524,313 A | * | 6/1985 | Kuno | G05B 19/231 318/563 |
| 6,652,320 B2 | | 11/2003 | Inagawa et al. | |
| 7,486,403 B2 | | 2/2009 | Osaka et al. | |
| 2011/0204838 A1 | * | 8/2011 | Nakasugi | B25J 9/1633 318/689 |
| 2012/0119689 A1 | * | 5/2012 | Yamada | H02P 23/005 318/630 |
| 2012/0215353 A1 | * | 8/2012 | Izumi | B25J 9/1641 700/254 |
| 2014/0379128 A1 | * | 12/2014 | Ishikawa | B25J 9/1674 700/250 |
| 2015/0330811 A1 | * | 11/2015 | Tsuchiya | G01D 5/145 318/653 |

FOREIGN PATENT DOCUMENTS

JP        2010-238174 A        10/2010

* cited by examiner

*Primary Examiner* — Kawing Chan
(74) *Attorney, Agent, or Firm* — Fitzpatrick, Cella, Harper & Scinto

(57) ABSTRACT

A robot apparatus includes a rectangular wave generating portion arranged on the output side of a speed reducer, and configured to generate first output pulse signals upon driving of a joint. A control portion includes calculating portions and a motor control portion. The motor control portion estimates an estimated joint angle using input pulse signals, and controls to operate a servo motor so that this estimated joint angle matches a target joint angle. The calculating portions calculate a torsion angle of the joint corresponding to a deviation amount between the first output pulse signals and a pulse waveform of an ideal state. The motor control portion controls to operate the servo motor so as to correct the estimated joint angle by the torsion angle.

13 Claims, 11 Drawing Sheets

ROBOT APPARATUS, ROBOT CONTROL METHOD, PROGRAM, AND RECORDING MEDIUM

BACKGROUND OF THE INVENTION

1. Field of the Invention

The present invention relates to a robot apparatus and a robot control method, which calculate a torsion of a joint to control an angle of the joint when the joint of a robot main body is driven by a rotary motor via a speed reducer.

2. Description of the Related Art

In general, a joint of a robot main body such as a robot arm is driven using a servo motor such as an AC servo motor or DC brushless motor, and a speed reducer is arranged on the output side of the servo motor so as to obtain a high output torque and is coupled to a structure member such as a link.

Conventionally, angle control of each joint of a robot arm is executed by detecting a rotation angle of a servo motor shaft using a rotary encoder (encoder) directly coupled to the servo motor shaft. However, since a speed reducer coupled to the servo motor suffers a torsion and cluttering in terms of its structure, a torsion is generated in a joint, and a joint angle cannot be precisely calculated based on the rotation angle of the servo motor shaft. For this reason, this results in a position error of the robot main body such as a robot arm distal end.

In recent years, in order to reduce a position error of the robot main body, a technique for detecting a position by an absolute encoder coupled to an output shaft of the speed reducer has been proposed (see Japanese Patent Application Laid-Open No. 2010-238174). Since a joint angle can be directly detected using the absolute encoder, a position error of the robot main body can also be reduced.

However, when the absolute encoder is coupled to the output shaft of the speed reducer like in Japanese Patent Application Laid-Open No. 2010-238174 above, a very high resolution is required for the absolute encoder.

More specifically, in a method in which the absolute encoder is mounted on a rotating shaft of a motor, since a resolution corresponding to a speed reduction ratio is relaxed in the speed reducer, a low-resolution encoder can be used. On the other hand, the absolute encoder arranged on the output shaft side of the speed reducer is required to have a high resolution obtained by multiplying the resolution of the encoder mounted on the motor by the speed reduction ratio. For example, when the speed reduction ratio of the speed reducer is designed to fall within a range of about 50 to 160, the absolute encoder arranged on the output shaft side of the speed reducer requires a resolution about 50 to 160 times that of the encoder mounted on the motor side.

In the absolute encoder, the number of detection elements such as light-emitting elements and light-receiving elements is increased with increasing resolution, resulting in a complicated structure, and increases in cost and size. For this reason, when the absolute encoder for joint angle detection is mounted on each joint of the robot main body, the cost and size of the robot apparatus are unwontedly increased.

Thus, the present invention provides a low-cost, compact robot apparatus, which can control each joint of the robot main body to a target joint angle with high precision.

SUMMARY OF THE INVENTION

A robot apparatus of the present invention comprises: a rotary motor; a speed reducer configured to decelerate an output of the rotary motor; a robot main body having a joint driven by the rotary motor via the speed reducer; a control portion configured to control driving of the joint by the rotary motor so that an angle of the joint matches a target joint angle; an input encoder portion arranged on an input side of the speed reducer, and configured to generate input pulse signals upon rotation of a rotating shaft of the rotary motor; and a rectangular wave generating portion arranged on an output side of the speed reducer, and configured to generate first output pulse signals according to an angle of the joint upon driving of the joint, wherein the control portion executes a first control process for estimating an angle of the joint in an ideal state in which the joint is free from any torsion from a rotation angle of the rotating shaft of the rotary motor indicated by the input pulse signals and a speed reduction ratio of the speed reducer, and controlling to operate the rotary motor so that an estimated joint angle matches the target joint angle, a torsion angle calculating process for calculating a torsion angle of the joint corresponding to a deviation amount between the first output pulse signals and a pulse waveform assumed to be obtained from the rectangular wave generating portion in the ideal state, and a correction control process for controlling to operate the rotary motor to correct the estimated joint angle by the torsion angle.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[First Embodiment]

Figure 1:
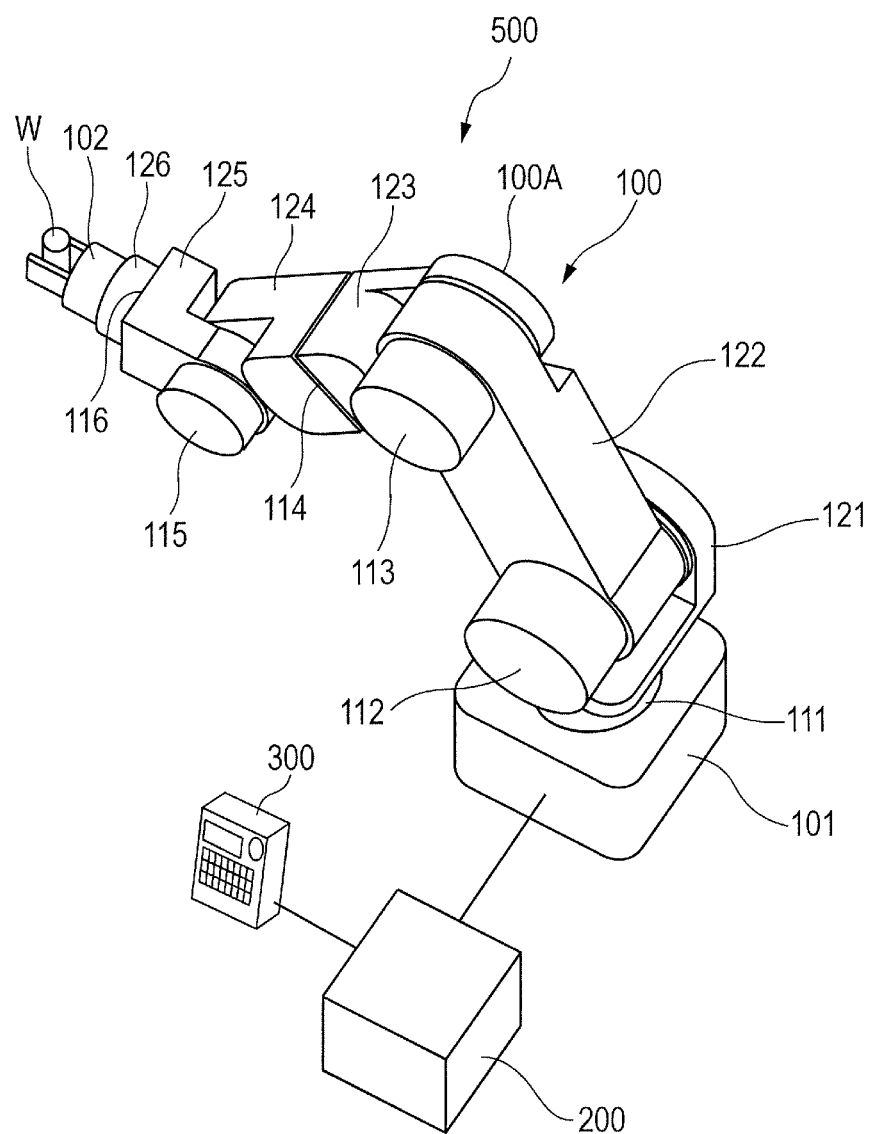
FIG. 1 is a schematic perspective view showing the arrangement of a robot apparatus according to the first embodiment.

FIG. 1 is a schematic perspective view showing the arrangement of a robot apparatus according to the first embodiment of the present invention. A robot apparatus 500 shown in FIG. 1 is, for example, an industrial robot which performs an assembly operation and the like, and includes a vertical 6-axis articulated robot arm 100, a control apparatus 200 which controls the robot arm 100, and a teaching pendant 300 connected to the control apparatus 200.

The robot arm 100 includes a robot main body 100A including a base portion 101 fixed to a work table, a plurality of links 121 to 126 which transmit displacements and forces, and a plurality of joints 111 to 116 which couple the links 121 to 126 to be turnable or rotatable.

Also, a hand 102 is coupled to the distal end of the robot arm 100, that is, the link 126. The hand 102 is an end effector which performs an operation for, for example, gripping an arbitrary work W.

To each of the joints 111 to 116, a servo motor as an electromagnetic motor as a rotary motor, an encoder which detects a rotation angle of a rotating shaft of the servo motor, and a speed reducer which decelerates the output of the servo motor so as to increase a torque of the servo motor are arranged. As the speed reducer, a strain strain wave gearing, which is compact and lightweight and has a large speed reduction ratio, is desirably used.

Figure 2:
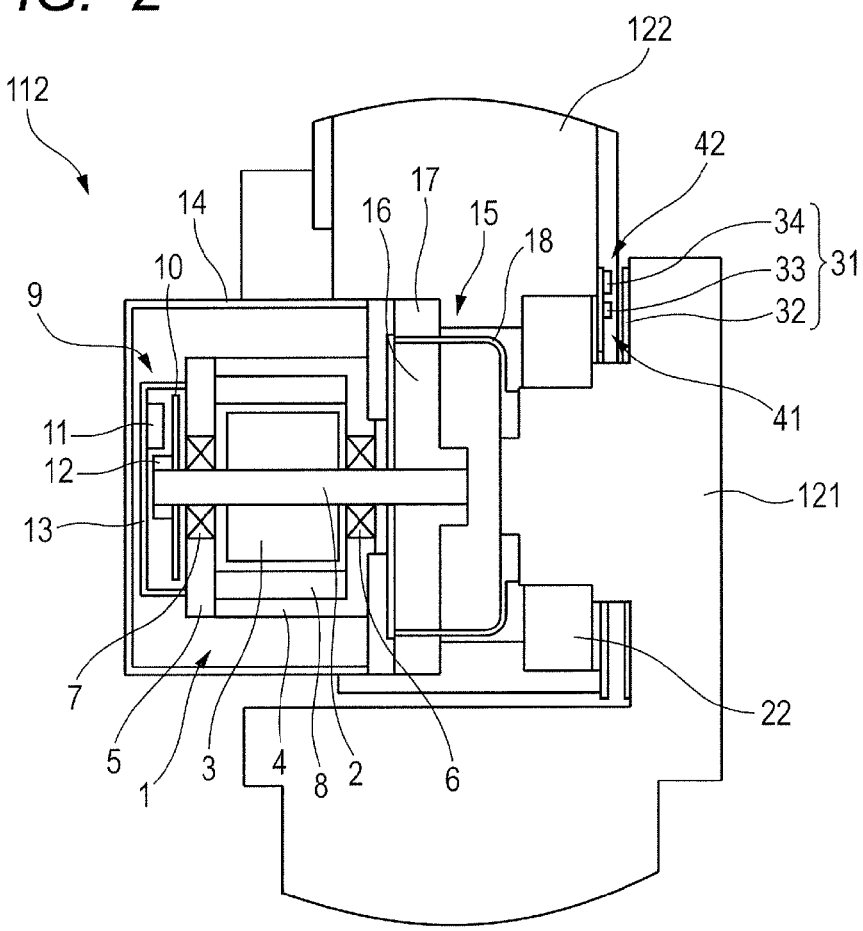
FIG. 2 is a sectional view of a robot arm in the vicinity of a joint shown in FIG. 1.

The joint 112 will be described below as a representative of the joints 111 to 116. FIG. 2 is a sectional view of the robot arm 100 in the vicinity of the joint 112 shown in FIG. 1.

As shown in FIG. 2, a servo motor 1 and a speed reducer 15 which decelerates the output (rotation angle) of the servo motor 1 are arranged in the joint 112. The servo motor 1 is, for example, a brushless DC servo motor or AC servo motor.

The servo motor 1 includes a rotor portion configured by a rotating shaft 2 and rotor magnet 3. Bearings 6 and 7 which rotatably support the rotating shaft 2 are arranged in motor housings 4 and 5, and a stator coil 8 is attached to the motor housing 4.

An input encoder portion 9 as a rotary encoder, which detects the rotation angle of the rotating shaft 2, is arranged on one end portion of the rotating shaft 2. That is, this input encoder portion 9 is arranged on the input side of the speed reducer 15. Then, the input encoder portion 9 generates input pulse signals upon rotation of the rotating shaft 2 of the servo motor 1, and outputs the pulse signals to the control apparatus 200 shown in FIG. 1. The input encoder portion 9 may be an incremental rotary encoder, but it is desirably an absolute rotatory encoder which can detect an absolute angle to have a predetermined rotation position of the servo motor 1 as an origin.

The input encoder portion 9 is configured by an encoder scale 10, an encoder head 11 allocated to oppose the encoder scale 10, a flange 12 which fixes the encoder scale 10 to the rotating shaft 2, and an anti-dust encoder cover 13. The servo motor 1 is covered by a motor cover 14.

A brake unit (not shown) may be arranged between the servo motor 1 and input encoder portion 9 as needed. The principal purpose of the brake unit is to hold the posture of the robot main body 100A upon power-OFF.

The speed reducer 15 as a strain strain wave gearing having a speed reduction ratio N is attached to the other end portion of the rotating shaft 2 of the servo motor 1.

This speed reducer 15 includes a wave generator 16 as an input portion, a circular spline 17, and a flex spline 18 arranged between the wave generator 16 and circular spline 17.

The flex spline 18 is coupled to the link 121, and is decelerated at the speed reduction ratio N of the speed reducer 15. The circular spline 17 as an output portion of the speed reducer 15 is coupled to the link 122. The wave generator 16 is coupled to the rotating shaft 2 of the servo motor 1.

The coupled portion between the rotating shaft 2 of the servo motor 1 and the wave generator 16 serves as an input shaft of the speed reducer 15, and the coupled portion between the flex spline 18 and link 121 serves as an output shaft of the speed reducer 15. A rotation angle of the output shaft of the speed reducer 15 is an output angle, that is, an angle of the joint 112.

A cross roller bearing 22 is arranged between the links 121 and 122, which are rotatably coupled to each other via the cross roller bearing 22. In this manner, the rotating shaft 2 of the servo motor 1 is decelerated to 1/N via the speed reducer 15, and the links 121 and 122 are relatively rotated.

With the above arrangement, the joint 112 of the robot main body 100A is driven by the servo motor 1 via the speed reducer 15. In a general industrial robot, a timing belt is arranged between the servo motor and speed reducer to transmit power in some cases. When pulley diameters used for the timing belt are different, the motor output is decelerated or accelerated. Of course, a power transmission element such as the timing belt generates a torsion and cluttering. The same applies to transmission elements such as gears arranged in place of the timing belt. In this embodiment, transmission elements between the servo motor and speed reducer are handled as a part of the speed reducer.

A joint encoder 31 detects a relative angle between the links 121 and 122, and includes a rectangular wave generating portion 41 and incremental output encoder portion 42. The joint encoder 31 is arranged on the output side of the speed reducer 15. The rectangular wave generating portion 41 generates first output pulse signals according to an angle of the joint 112 upon driving of the joint 112, and outputs the pulse signals to the control apparatus 200 (FIG. 1). Also, the output encoder portion 42 generates second output pulse signals upon driving of the joint 112, and outputs the pulse signals to the control apparatus 200 (FIG. 1).

The joint encoder 31 includes a joint encoder scale 32, first detection head 33, and second detection head 34. In the description of the first embodiment, the joint encoder 31 is a reflective rotary encoder, but it may be a transmissive rotary encoder.

The joint encoder scale 32 is arranged to be fixed to the surface of the link 121, and the detection heads 33 and 34 are arranged to be fixed to the surface of the link 122 so as to oppose the joint encoder scale 32.

Figure 3:
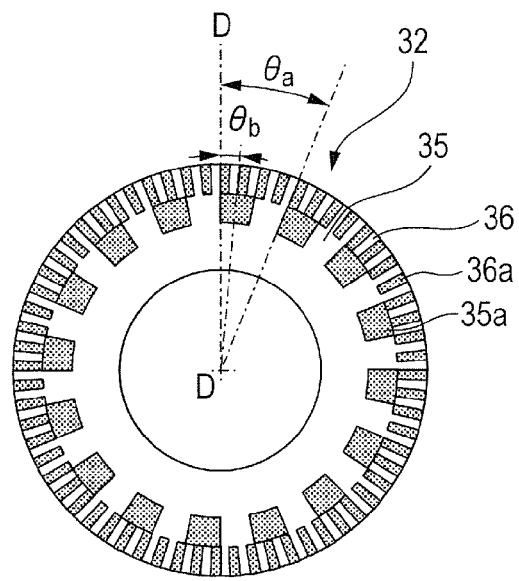
FIG. 3 is a plan view of a joint encoder scale.

FIG. 3 is a plan view of the joint encoder scale 32. The joint encoder scale 32 is formed in a disk shape or ring shape, and is configured by a first scale 35 formed on the inner periphery side and a second scale 36 formed on the outer periphery side. On the first scale 35, first patterns 35a are formed at a first pitch angle $\theta_a$. On the second scale 36, second patterns 36a are formed at a second pitch angle $\theta_b$. These patterns 35a and 36a are radially formed with respect to the rotation center of the joint.

The first detection head 33 relatively rotates upon rotation of the output shaft of the speed reducer 15 with respect to the first scale 35 of the joint encoder scale 32, reads the first patterns 35a, and outputs the first output pulse signals to the control apparatus 200 (FIG. 1). The second detection head 34 relatively rotates upon rotation of the output shaft of the speed reducer 15 with respect to the second scale 36 of the joint encoder scale 32, reads the second patterns 36a, and outputs the second output pulse signals to the control apparatus 200 (FIG. 1). The first detection head 33 and first scale 35 configure the rectangular wave generating portion 41. Also, the second detection head 34 and second scale 36 configure the output encoder portion 42.

The rectangular wave generating portion 41 can divisionally detect an angle of the joint 112 at the first pitch angle $\theta_a$. Likewise, the output encoder portion 42 can divisionally detect an angle of the joint 112 at the second pitch angle $\theta_b$.

In the first embodiment, the second pitch angle $\theta_b$ is smaller than the first pitch angle $\theta_a$. That is, an interval of the first patterns 35a is broader than that of the second patterns 36a. Therefore, the output encoder portion 42 has a resolution higher than the rectangular wave generating portion 41.

Also, the first pitch angle $\theta_a$, is an integer multiple of the second pitch angle $\theta_b$, and the output encoder portion 42 can detect an angle of the joint 112 at a resolution corresponding to an integer multiple of that of the rectangular wave generating portion 41.

Note that the detection heads 33 and 34 preferably generate 2-phase outputs so as to allow discrimination of a rotation direction. Also, in order to improve the resolutions of the detection heads 33 and 34, an electrical dividing unit may be further added.

An origin of the joint encoder 31 will be described below further using FIG. 3. In order to control an angle of the joint 112, an origin is set at an arbitrary position, and angle control is executed with reference to this origin.

In order to specify the position of the origin, through holes may be formed in the links 121 and 122 at the position of the origin. By inserting a shaft through these holes, an origin between the links 121 and 122 can be specified.

A line segment D-D in FIG. 3 represents positions to be detected by the first detection head 33 and second detection head 34 described using FIG. 2. The joint encoder scale 32 and the detection positions of the first and second detection heads 33 and 34 are adjusted and laid out so that the position of the line segment D-D becomes the origin position of the joint 112.

Figure 4:
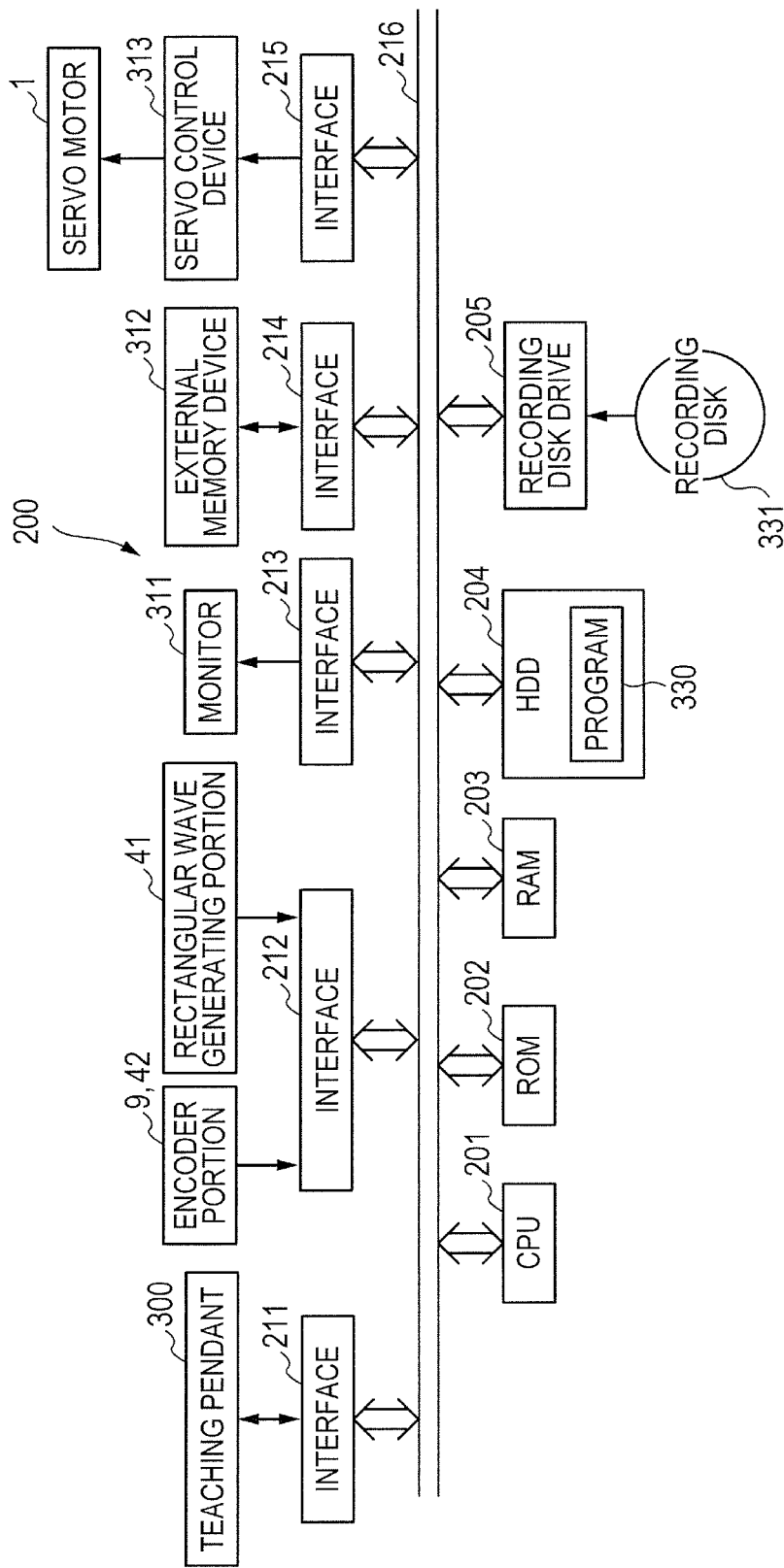
FIG. 4 is a block diagram showing the arrangement of a control apparatus of the robot apparatus.

FIG. 4 is a block diagram showing the arrangement of the control apparatus 200 of the robot apparatus 500. The control apparatus 200 includes a CPU 201 as a control portion, a ROM 202, a RAM 203, an HDD 204 as a memory unit, a recording disk drive 205, and various interfaces 211 to 215.

To the CPU 201, the ROM 202, RAM 203, HDD 204, recording disk drive 205, and various interfaces 211 to 215 are connected via a bus 216. The ROM 202 stores a basic program such as a BIOS. The RAM 203 is a memory device which temporarily stores a calculation process result of the CPU 201. The recording disk drive 205 stores teaching data acquired from the teaching pendant, and operation programs of operation sequences.

The HDD 204 is a memory portion which stores various data as calculation process results of the CPU 201, and also records a program 330 for controlling the CPU 201 to execute various calculation processes (to be described later). The CPU 201 executes various calculation processes based on the program 330 recorded (stored) in the HDD 204.

The recording disk drive 205 can read out various data, programs, and the like recorded on a recording disk 331.

To the interface 211, the teaching pendant 300 is connected. The teaching pendant 300 is operated by the user, and sequentially outputs target joint angles of the joints 111 to 116 according to user operations. The CPU 201 receives data signals of the target joint angles input from the teaching pendant 300 via the interface 211 and bus 216.

To the interface 212, the encoder portions 9 and and the rectangular wave generating portion 41 are connected. The encoder portions 9 and 42 and the rectangular wave generating portion 41 output pulse signals indicating angles. The CPU 201 receives the pulse signals input from the encoder portions 9 and 42 and the rectangular wave generating portion 41 via the interface 212 and bus 216.

To the interface 213, a monitor 311 is connected, and the monitor 311 displays various images. To the interface 214, an external memory device 312 such as a rewritable nonvolatile memory or external HDD is connected.

To the interface 215, a servo control device 313 is connected. The CPU 201 outputs data of a driving instruction which indicates a control amount of a rotation angle of the rotating shaft 2 of the servo motor 1 to the servo control device 313 at predetermined time intervals via the bus 216 and interface 215. The servo control device 313 calculates an output amount of a current to the servo motor 1 based on the driving instruction input from the CPU 201 as the control portion, and supplies the current to the servo motor 1, thereby executing the joint angle control of the joints 111 to 116 of the robot main body 100A.

That is, the CPU 201 controls driving of the joint 112 by the servo motor 1 via the servo control device 313, so that an angle of the joint 112 becomes a target joint angle.

Figure 5:
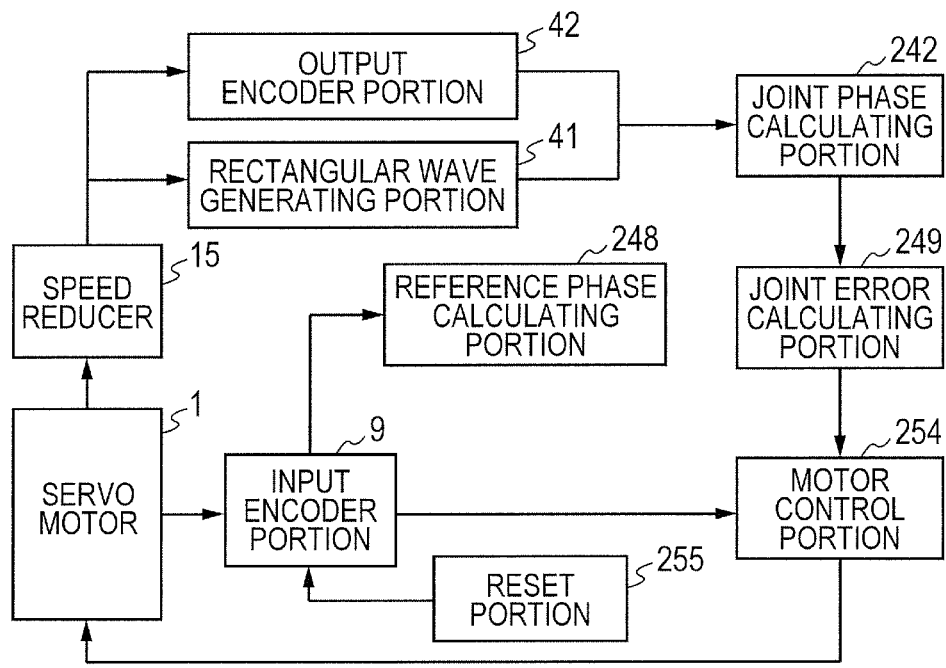
FIG. 5 is a functional block diagram showing a control system of the robot apparatus according to the first embodiment.

FIG. 5 is a functional block diagram showing a control system of the robot apparatus according to the first embodiment of the present invention. Note that the CPU 201 as the control portion shown in FIG. 4 functions as respective portions 242, 248, 249, 254, and 255 shown in FIG. 5 by executing the program 330. Note that the operations of the respective portions will be roughly explained below.

A reset portion 255 clears an encoder value of the input encoder portion 9. A joint phase calculating portion 242 receives the first output pulse signals and second output pulse signals input from the rectangular wave generating portion 41 and output encoder portion 42. Then, the joint phase calculating portion 242 counts the second output pulse signals with reference to the first output pulse signals, and calculates an angle corresponding to the count value, that is, a joint phase angle.

A reference phase calculating portion 248 calculates an estimated joint phase angle in an ideal state from a rotation angle obtained from the pulse signals of the input encoder portion 9, the speed reduction ratio N of the speed reducer 15, and the pitch angle $\theta_a$. That is, the reference phase calculating portion 248 estimates an angle of the joint 112 by calculating a rotation angle of the rotating shaft 2 of the servo motor 1 from the input pulse signals detected by the input encoder portion 9, and dividing this rotation angle by the speed reduction ratio N. This estimated joint angle is a joint angle in an ideal state when the joint 112 is free from any torsion. A remainder obtained when this estimated joint angle is divided by the pitch angle $\theta_a$, is an estimated joint phase angle. That is, the ideal state is that under the assumption that the speed reducer 15 is free from any torsion. In this ideal state, a value obtained by dividing the rotation angle of the input shaft by the speed reduction ratio N matches a joint angle.

A joint error calculating portion 249 calculates a joint error, that is, a torsion angle of the joint 112 from the calculation result of the reference phase calculating portion 248 and that of the joint phase calculating portion 242. A difference between the estimated joint angle and an actual joint angle is the torsion angle (joint error) of the joint 112. The reason why a joint error is generated includes a plurality of factors such as an elastic torsion deformation and cluttering of the speed reducer 15, a torsion of the motor shaft, and the like.

A motor control portion 254 determines the control amount of the motor from the value of the rotation angle indicated by the pulse signals of the input encoder portion 9 and the joint error, and controls driving of the servo motor 1.

An origin detection method of the input encoder portion 9, which is executed prior to the operation such as an assembly operation by the robot apparatus 500 will be described below.

Figure 6:
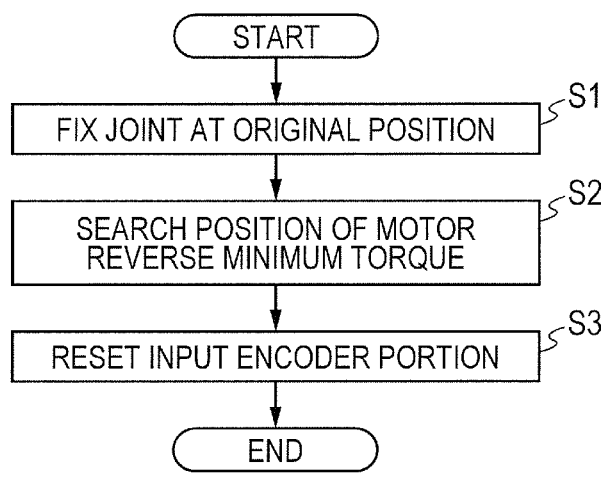
FIG. 6 is a flowchart showing origin detection of an input encoder portion.

FIG. 6 is a flowchart showing origin detection of the input encoder portion 9. Initially, the user inserts a shaft member in holes which extend through the links 121 and 122 to fix the joint 112 to the origin position (step S1).

Next, the user operates the teaching pendant 300 to send an instruction to the CPU 201, thus searching for a motor rotation position of a minimum reverse torque of the servo motor 1 (step S2). Note that this reverse torque can also be estimated from the driving electric current of the motor.

Next, the user operates the teaching pendant 300 to send an instruction to the CPU 201, and the reset portion 255 (CPU 201) resets the input encoder portion 9 (step S3).

In the operations of steps S1 to S3, when the joint encoder 31 including the rectangular wave generating portion 41 and output encoder portion 42 is located at an origin position and when there is no joint error, the origin of the input encoder portion 9 is detected by resetting the input encoder portion 9 by the reset portion 255.

Figure 7:
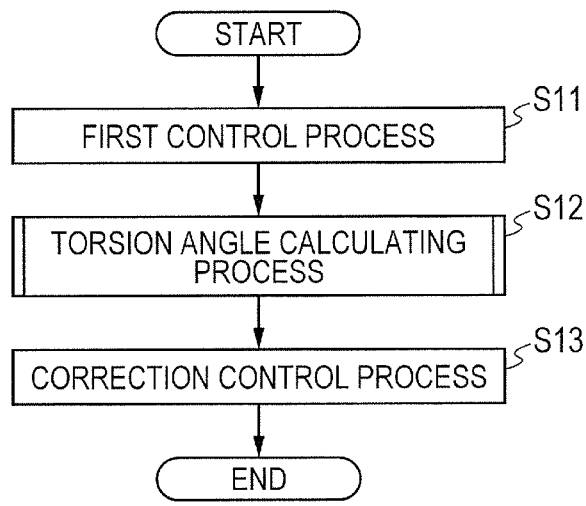
FIG. 7 is a flowchart showing a joint angle control operation of a CPU according to the first embodiment.

The robot control method, that is, the angle control operation of the joint 112 by the CPU 201 as the control portion of the first embodiment will be described below. FIG. 7 is a flowchart showing the angle control operation of the joint 112 by the CPU 201 according to the first embodiment. Note that respective process steps shown in FIG. 7 are executed when the CPU 201 reads out the program 330 and executes the program 330.

Initially, the CPU 201, which functions as the motor control portion 254 in FIG. 5, sequentially calculates the rotation angle of the rotating shaft 2 of the servo motor 1 based on the input pulse signals from the input encoder portion 9 during control of the servo motor 1. Then, the CPU 201 estimates an angle (estimated joint angle) of the joint 112 in the ideal state in which the joint 112 is free from any torsion from the rotation angle of the rotating shaft 2 of the servo motor 1 and the speed reduction ratio N of the speed reducer 15. More specifically, the CPU 201 calculates an estimated joint angle by dividing the rotation angle by the speed reduction ratio N.

The CPU 201 executes a first control process for controlling to operate the servo motor so that this estimated joint angle becomes a target joint angle acquired from an operation program or the teaching pendant 300 (first control step S11).

Next, the CPU 201, which functions as the joint phase calculating portion 242, reference phase calculating portion 248, and joint error calculating portion 249, executes a torsion angle calculating process for calculating a torsion angle θ of the joint 112 (torsion angle calculating step S12). This torsion angle (joint error) θ corresponds to a deviation amount between the first output pulse signals obtained from the rectangular wave generating portion 41 and a pulse waveform assumed to be obtained from the rectangular wave generating portion 41 in the ideal state.

Figure 8:
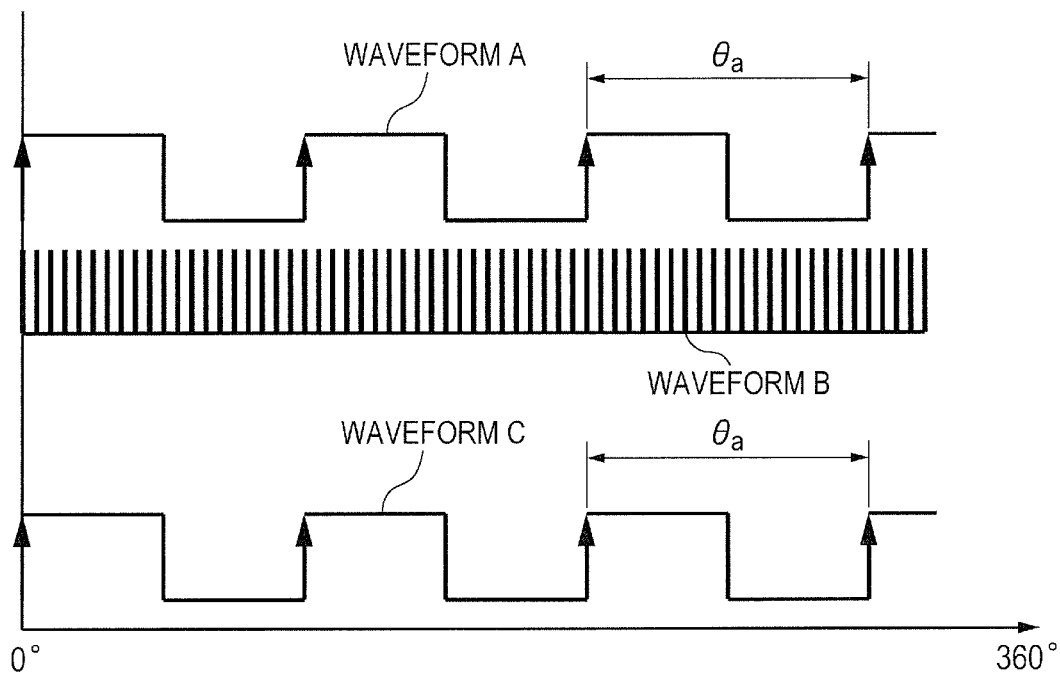
FIG. 8 is a waveform chart showing pulse signals in an ideal state in which each joint is free from any torsion.
Figure 9:
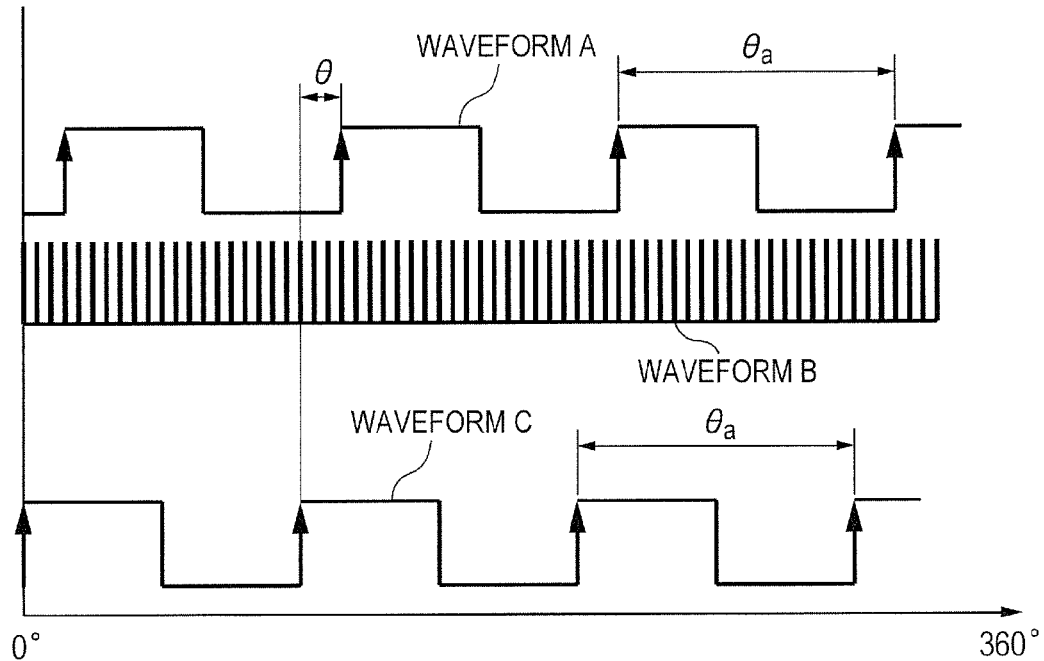
FIG. 9 is a waveform chart showing pulse signals in a state in which each joint suffers a torsion.

FIG. 8 is a waveform chart showing pulse signals in the ideal state in which the joint 112 is free from any torsion, and FIG. 9 is a waveform chart showing pulse signals in a state in which the joint 112 suffers a torsion.

In FIGS. 8 and 9, a waveform A is a pulse waveform of the first output pulse signals output from the rectangular wave generating portion 41. Also, a waveform B is a pulse waveform of the second output pulse signals output from the output encoder portion 42. A waveform C is a pulse waveform assumed to be obtained from the rectangular wave generating portion 41 in the ideal state. That is, the waveform C is a calculated waveform obtained by dividing the estimated joint angle calculated based on the input pulse signals by the pitch angle $\theta_a$.

As shown in FIG. 8, in the ideal state in which the torsion angle of the joint 112 is zero, that is, it is free from any joint error, the waveforms A and C match. When a torsion is generated in the joint 112, the waveforms A and B have a phase shift corresponding to a torsion angle θ, as shown in FIG. 9. Therefore, the CPU 201 can calculate this torsion angle θ.

Next, the CPU 201, which functions as the motor control portion 254, executes a correction control process for controlling to operate the servo motor 1, so that the estimated joint angle is corrected by the torsion angle θ (correction control step S13).

Note that the CPU 201 repetitively executes steps S11 to S13 again when it receives an input of data of the next target joint angle.

Figure 10:
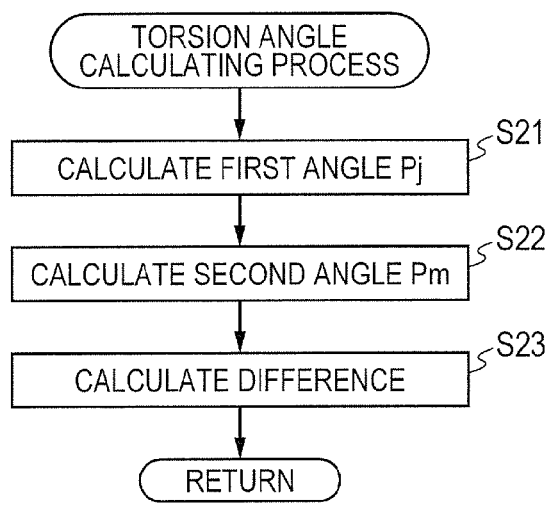
FIG. 10 is a flowchart showing a process operation of a torsion angle calculation process by the CPU.

The torsion angle calculating process in step S12 will be described in detail below. FIG. 10 is a flowchart showing the process operation of the torsion angle calculating process by the CPU 201.

The CPU 201, which functions as the joint phase calculating portion 242, counts the number of pulses of the second output pulse signals to have edges of the first output pulse signals acquired from the rectangular wave generating portion 41 as triggers during the operation of the servo motor 1 by the first control process in step S11. Then, the CPU 201 executes a first angle calculating process for calculating a first angle (joint phase angle) Pj between the estimated joint angle and the edge of the first output pulse signal based on the count result (first angle calculating step S21).

Figure 11:
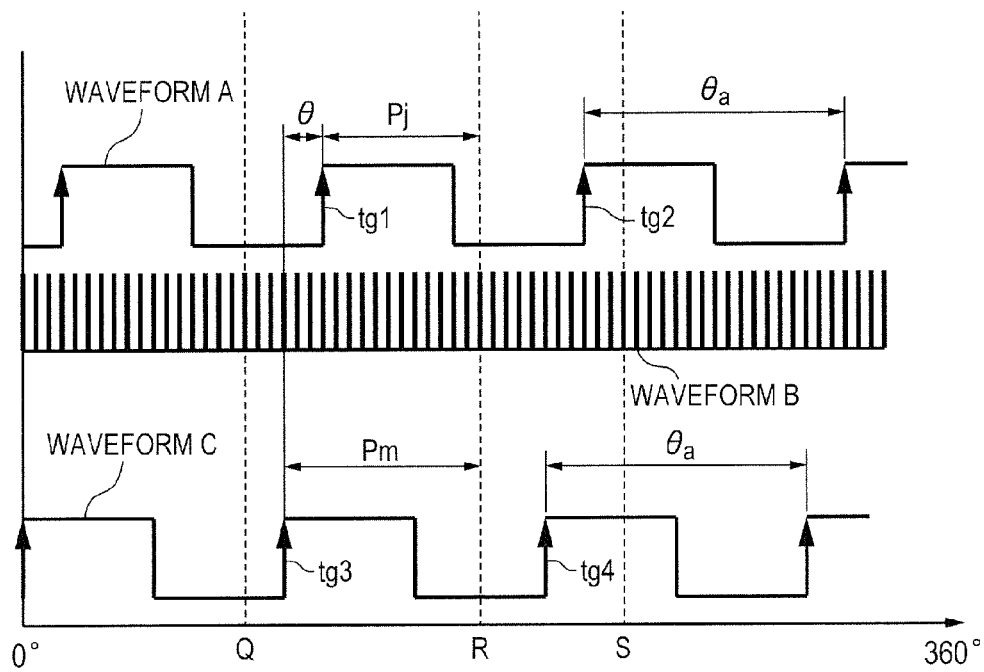
FIG. 11 is a waveform chart showing pulse signals in a state in which each joint suffers a torsion.

FIG. 11 is a waveform chart showing pulse signals when the joint 112 suffers a torsion. In FIG. 11, reference symbols Q, R, and S denote estimated joint angles calculated from the input pulse signals output from the input encoder portion 9. Also, in FIG. 11, reference symbols tg1 and tg2 denote leading edges of the waveform A; and tg3 and tg4, leading edges of the waveform C. A case will be described below wherein an angle calculated from the input pulse signals from the input encoder portion 9 changes from the estimated joint angle Q to the estimated joint angle R.

The joint phase calculating portion 242 functions as an up/down counter. The up/down counter includes a reset portion which clears a count value, a count portion which measures the number of pulses of input pulse signals, and an encoding portion of an up/down instruction of a count. In the first embodiment, the first detection head 33 is configured by a 2-phase sensor of a 90° phase, and can output a direction discrimination signal. The reset portion of the joint phase calculating portion 242 inputs the edge tg1 of the waveform A, the count portion inputs the waveform B, and the encoding portion inputs the direction discrimination signal.

That is, the joint phase calculating portion 242 begins to count pulses of the second output pulse signals obtained from the output encoder portion 42 since the edge tg1 is input. Then, the joint phase calculating portion 242 ends counting of pulses when an estimated angle of the joint 112 calculated from the input pulse signals obtained from the input encoder portion 9 becomes the estimated joint angle R. The joint phase calculating portion 242 then converts the count value into an angle, thereby calculating a first angle (joint phase angle) Pj. In this manner, by counting pulses of the second output pulse signals at a high resolution to have the pulse edge of the first output pulse signals as a trigger, the first angle Pj can be precisely calculated.

Also, the CPU 201, which functions as the reference phase calculating portion 248, executes a second angle calculating process for calculating a second angle Pm as a remainder obtained when the estimated joint angle R is divided by the pitch angle $\theta_a$ of the first output pulse signals (second angle calculating step S22). That is, the reference phase calculating portion 248 calculates the remainder of R÷a without calculating the waveform C, thereby simply calculating the second angle (estimated joint phase angle) Pm.

Next, the CPU 201, which functions as the joint error calculating portion 249, executes a difference calculating process for calculating a difference between the first angle Pj and second angle Pm as the torsion angle θ (difference calculating step S23). That is, the joint error calculating portion 249 executes a calculation θ=Pm−Pj.

In steps S21 to S23 above, a calculating unit of a joint error when the estimated joint angle is changed from Q to R has been described. Also, the same calculations are made when the estimated joint angle is changed from R to S. In this case, in step S21, the joint phase calculating portion 242 begins to count pulses of the second output pulse signals to have the leading edge tg2 as a trigger.

Note that in the first embodiment, the pitch angle $\theta_a$ is set to be an angle larger than twice of a maximum torsion angle of the joint 112. The maximum torsion angle of the joint 112 will be described below.

Figure 12:
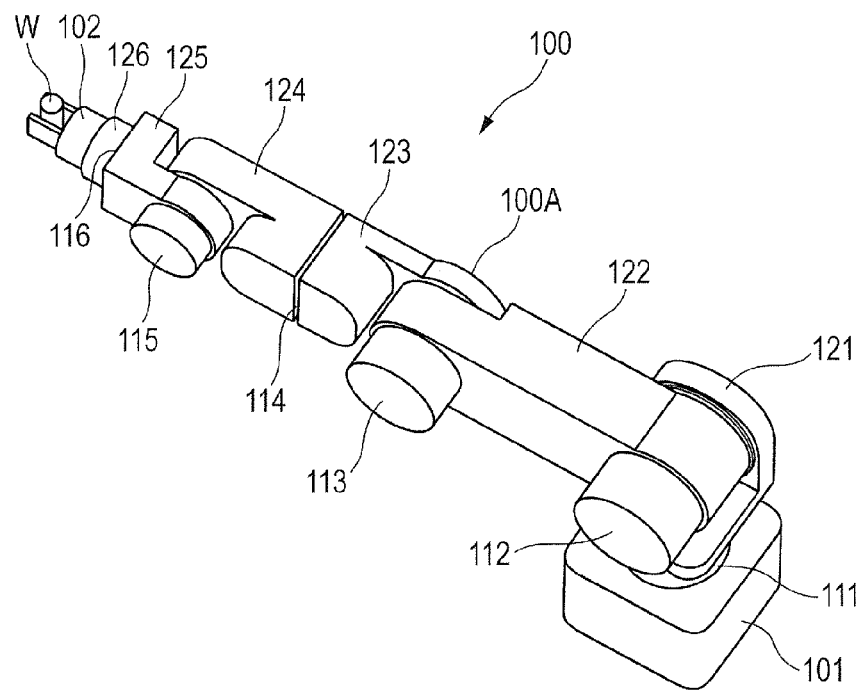
FIG. 12 is a perspective view showing a posture when the robot arm is extended in a horizontal direction.

FIG. 12 is a perspective view showing a posture of the robot arm 100 which is extended in the horizontal direction. A factor of a dominant joint error θ is an elasticity of the joint 112, and this elasticity will be described below using FIG. 12. The posture of the robot main body 100A shown in FIG. 12 is a moment maximum condition given to the joint 112.

A maximum torsion angle of the joint 112 can assume a value larger than that obtained by dividing the maximum moment acting on the joint 112 by a torsional rigidity of the speed reducer 15, that is, a value added with a margin. Letting M be the moment at that time, and k be the torsional rigidity of the speed reducer 15, a torsion angle is given by M/k. In practice, since the joint 112 suffers further torsion due to that of the rotating shaft 2 of the motor 1 and the like and cluttering of the speed reducer 15, a value Aj added with a margin is used as a maximum torsion angle. When the joint 112 is reversed through 180°, the maximum torsion angle is −Aj. The joint error θ is not more than ±Aj.

An allowable torque of the speed reducer 15 is often set, and the maximum joint torsion angle may be calculated from this allowable torque. That is, the maximum torsion angle can assume a value larger than that obtained by dividing the allowable torque of the speed reducer 15 by the torsional rigidity of the speed reducer 15, that is, a value added with a margin.

The pitch angle $\theta_a$ shown in FIGS. 8, 9, and 11 is always constant in the waveforms A and C, and is set as follows.
$\pm\theta_a/2 > \pm Aj$
$\theta_a > 2Aj$ That is, the pitch angle $\theta_a$ is preferably set to be larger than twice of the maximum torsion angle Aj. By setting such condition, one solution is obtained without yielding a plurality of solutions like $\theta \pm \theta_a \times n$ (n=1, 2, 3 . . . ) The torsion angle θ is a phase difference between the waveforms A and C, and is also a control correction amount of the motor control portion 254.

Figure 13:
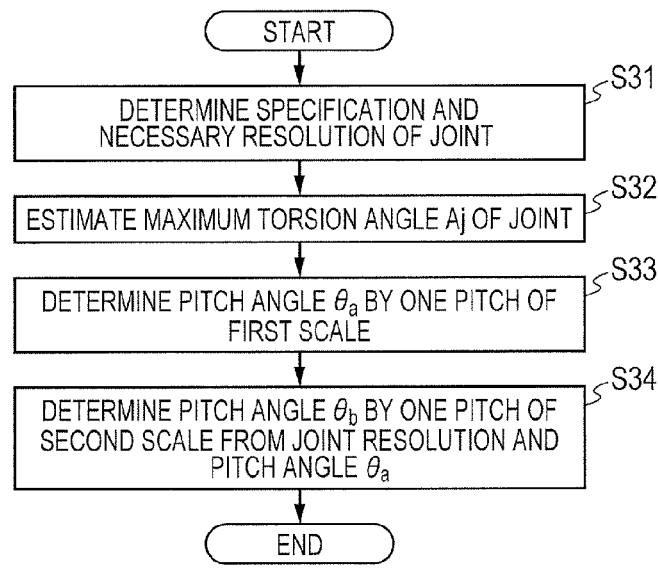
FIG. 13 is a flowchart showing a design sequence of a joint encoder.

A design example of the joint encoder 31 will be described below. FIG. 13 is a flowchart showing the design sequence of the joint encoder 31. The specification and necessary resolution of the joint 112 are determined (step S31). Next, a maximum torsion angle Aj of the joint 112 is estimated (step S32). Based on this estimation result, the pitch angle $\theta_a$ of the first patterns 35a of the first scale of the rectangular wave generating portion 41 is determined (step S33). Next, the pitch angle $\theta_b$ of the second patterns 36a of the second scale 36 of the output encoder portion 42 is determined based on the joint resolution and the pitch angle $\theta_a$ (step S34).

Steps S31 to S34 of the design sequence will be described in more detail below. Step S31 will be described first. In FIG. 12, assume that a distance from the rotation center of the joint 112 to the hand 102 is 0.7 [m], a mass of the robot arm from the joint 112 to the link 126 is 12 [kg], and a gravitational acceleration is 9.8 [m/s$^2$]. Assume that the barycenter of the robot arm from the joint 112 to the link 126 is located in the center of the distance=0.7 [m] from the rotation center of the joint 112 to the hand 102. Also, assume that a mass of the hand 102 and work W is 4 [kg]. Letting θd be an angle of a necessary joint resolution at the position of the hand 102, ΔL be a necessary resolving distance at the position of the hand 102, and Rh be a rotation radius from the rotation center to the position of the hand 102, θd is approximated by:
θd=ΔL÷Rh When the necessary resolving distance ΔL is 0.001 [mm], the angle θd of the joint resolution is calculated by:
θd=0.001 [mm]÷700 [mm]=1.43×10$^{-6}$ [rad] (=8.19×10$^{-5}$ [°])

Therefore, the necessary resolution per rotation is not less than 2π÷1.43×10$^{-6}$=4.4×10$^6$.

Step S32 of the design sequence will be described below. FIG. 12 shows an assumed posture which maximizes the torsion angle of the joint 112, and the robot arm 100 is extended in the horizontal direction. When the mass and barycentric position of the hand 102 and work W are maximum, this posture is a moment maximum condition given to the joint 112. The maximum torsion angle of the joint 112 of the robot arm is calculated by dividing a moment of the moment maximum condition by the torsional rigidity of the speed reducer. A moment acting on the joint 112 is given by:
M=12 [kg]×9.8 [m/s$^2$]33 0.7 [m]÷2+4 [kg]×9.8 [m/s$^2$]×0.7 [m]=68.6 [Nm]

Assuming that the speed reducer 15 is a strain strain wave gearing, and CSG-20-100-2A of harmonic drive® is selected, a rigidity value (constant of spring) ranges from 1.6×10$^4$ [Nm/rad] to 2.9×10$^4$ [Nm/rad] according to the brochure. If k=1.6×10$^4$ [Nm/rad] as the smallest rigidity value is adopted, a maximum torsion angle Aj is given by:
Aj=68.6 [Nm]÷1.6×10$^4$ [Nm/rad]=4.288×10$^{-3}$ [rad] (=0.246 [°])

The maximum torsion angle is calculated in consideration of only a torsion of the strain strain wave gearing as a dominant factor of a joint error, but a torsion of the rotating shaft 2 of the servo motor 1, the belt rigidity and cluttering upon belt driving, design margins, and the like have to be taken into consideration in practice. For this reason, the maximum torsion angle may be obtained by experiments.

Step S33 of the design sequence will be described below. Since the relation $\pm\theta_a/2 > \pm Aj$ holds, $\theta_a > 4.288 \times 10^{-3}$ [rad]$\times 2$ (=0.246 [°]$\times 2$=0.492 [°]) has to hold.

In order to form the first patterns 35a shown in FIG. 3, since they have to be divisible by the pitch angle $\theta_a$, $\theta_a$=0.5 [°]. Therefore, in the first scale 35, the first patterns 35a are divided into 720 per rotation.

Step S34 of the design sequence will be described below. The pitch angle $\theta_b$ has to be less than $8.19 \times 10^{-5}$ [20], and a÷b has to be an integer. Assuming that b=$8 \times 10^{-5}$ [°], a÷b=6250. Hence, since the condition is met, $\theta_b$=$8 \times 10^{-5}$ [°]. Therefore, in the second scale 36, the patterns are divided into 6250×720=4500000 per rotation. The output encoder portion 42 has the arrangement of an incremental encoder, and such divisions can be attained by further multiplying detection of 4500 divisions per rotation by 1000 using an electrical dividing unit.

A practical calculation example of the joint error θ under the assumption that the estimated joint angle R=123.45 [°] and the up/down counter (the joint phase calculating portion 242 in FIG. 5) used to detect the joint phase angle Pj counts 2000 pulses.

Since the estimated joint phase angle Pm can be obtained by calculating the remainder of R÷a, the remainder of 123.45 [°]÷0.5 [°] is 0.45 [°], that is, Pm=0.45 [°].

Since the detection value of the up/down counter corresponds to 2000 pulses and the pitch angle corresponds to 6250 pulses, the joint phase angle Pj can be calculated using a proportional distribution by:
Pj=2000÷6250×0.5 [°]=0.16 [°]

Therefore, the joint error θ is calculated by:
θ=Pm−Pj=0.45 [°]−0.16 [°]=0.29 [°]

As described above, according to the first embodiment, the CPU 201 as the control portion calculates the torsion angle θ of the joint 112 based on the detection result of the rectangular wave generating portion 41, and controls the servo motor 1. Therefore, even when a joint error is generated due to insufficient rigidity and cluttering of the speed reducer 15, the angle of the joint 112 can be controlled to match the target joint angle with high precision. In addition, since the rectangular wave generating portion 41 and the output encoder portion 42 are incremental rotary encoders, a compact, low-cost robot apparatus 500 can be implemented compared to the arrangement using absolute rotary encoders.

The joint 112 of the robot main body 100A has been described. Also, the remaining joints 111 and 113 to 116 have the same arrangement, and can be similarly controlled. In this case as well, the angles of the joints 111 and 113 to 116 can be controlled to match target joint angles with high precision. Therefore, the robot main body 100A can be precisely aligned. In this way, the operation precision such as linearity can be improved.

[Second Embodiment]

Figure 14:
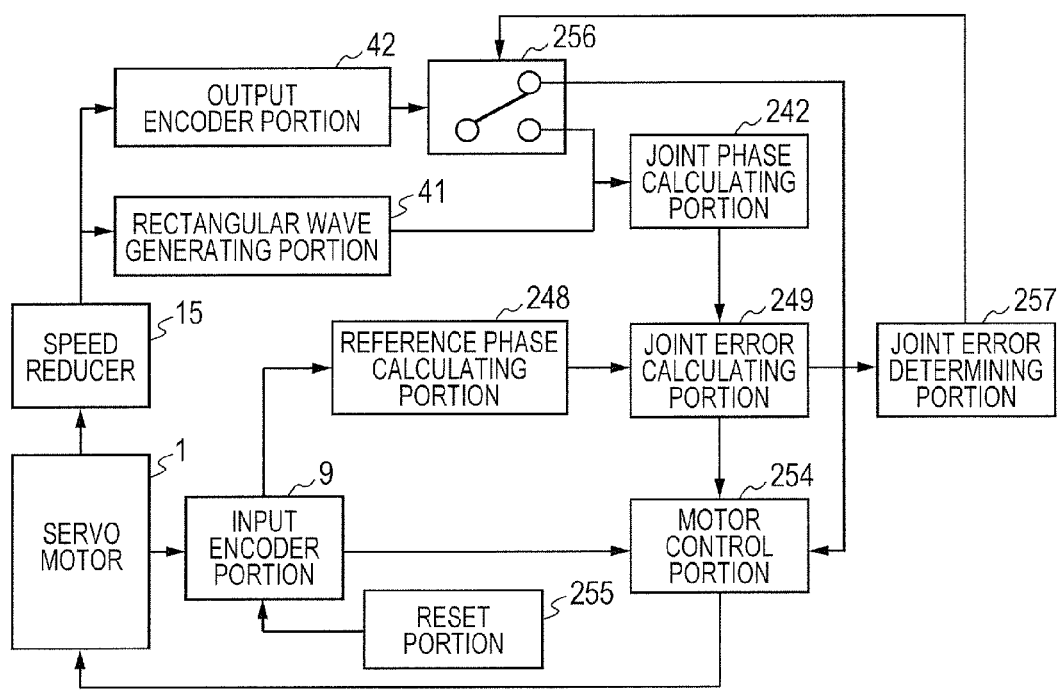
FIG. 14 is a functional block diagram showing a control system of a robot apparatus according to the second embodiment.

A robot apparatus according to the second embodiment of the present invention will be described below. FIG. 14 is a functional block diagram showing a control system of the robot apparatus according to the second embodiment of the present invention. Note that the same reference numerals in the second embodiment denote the same components as in the first embodiment, and a description thereof will not be repeated. In the second embodiment, the apparatus arrangement is the same as that of the first embodiment, and control operations of a CPU 201 in a control apparatus 200 shown in FIG. 4, that is, the contents of a program 330 are different from the first embodiment.

The CPU 201 (see FIG. 4) of the second embodiment further has functions of a signal switching portion 256 and joint error determining portion 257.

The signal switching portion 256 switches second output pulse signals from an output encoder portion 42 to a joint phase calculating portion 242 or motor control portion 254. When the second output pulse signals are switched to the motor control portion 254, angle control of a joint is executed based on only values of the second output pulse signals of the output encoder portion 42. The joint error determining portion 257 determines based on a power supply state or the like whether or not a calculation of a joint error is complete.

Figure 15:
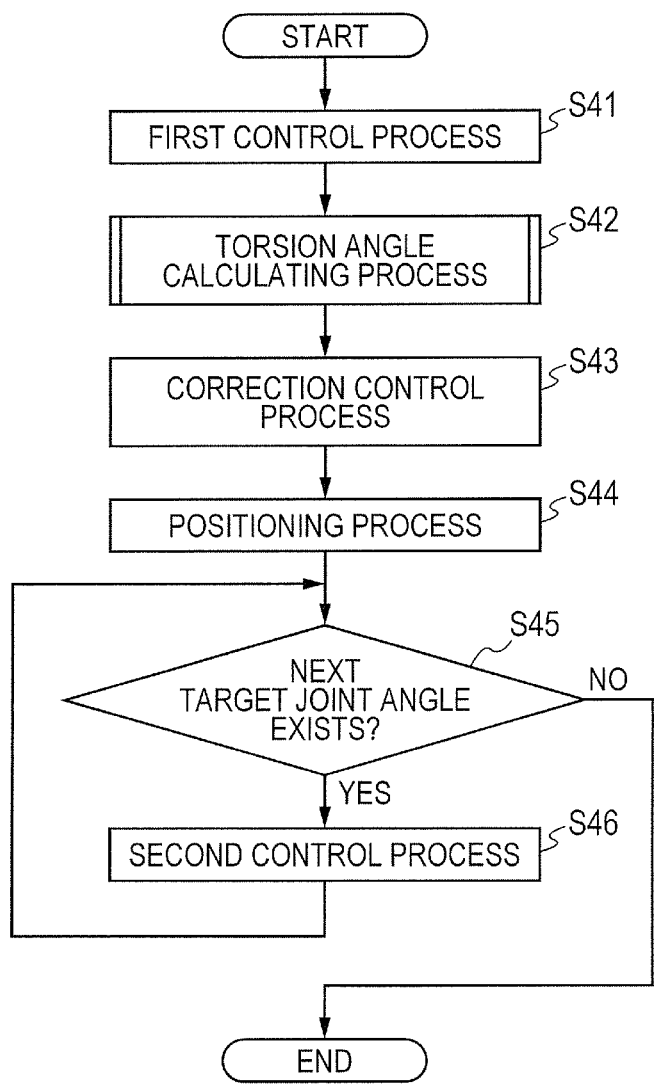
FIG. 15 is a flowchart showing a joint angle control operation of a CPU according to the second embodiment.

FIG. 15 is a flowchart showing a joint angle control operation by the CPU according to the second embodiment. Note that respective process steps shown in FIG. 15 are executed when the CPU 201 (see FIG. 4) reads out the program 330 and executes the program 330.

The CPU 201 executes a first control process (first control step S41), a torsion angle calculating process (torsion angle calculating step S42), and a correction control process (correction control step S43) as in the first embodiment.

After step S42, since the calculation of the torsion angle, that is, the joint error is complete, the joint error determining portion 257 determines that the calculation is complete. Then, the signal switching portion 256 switches a pulse signal transmission destination from the joint phase calculating portion 242 to the motor control portion 254. Therefore, the pulse signals output from the output encoder portion 42 are supplied to the motor control portion 254.

Next, the CPU 201 executes a positioning process for associating a count value of the second output pulse signals obtained from the output encoder portion 42 when a joint angle is corrected in step S43 with a target joint angle (positioning step S44). When a joint angle immediately after correction is converted into a count value of the (second) output pulse signals, and this converted value is updated as the count value of the (second) output pulse signals, the angle of the joint 112 can be detected as a count value of the second output pulse signals in the subsequent processes. In this manner, the CPU 201 detects the position of the output encoder portion 42 by correcting the joint angle.

Next, the CPU 201 determines whether or not the next target joint angle exists, that is, whether or not data of the next target joint angle is received from a teaching pendant 300 (FIG. 1) or an operation program (step S45).

If the next target joint angle does not exist (NO in step S45), the CPU 201 ends the control; if the next target joint angle exists (YES in step S45), the CPU 201 executes a second control process (second control step S46). That is, the CPU 201 controls to operate the servo motor 1 based on the count value of the second output pulse signals upon controlling the joint angle to the next target joint angle.

In this manner, since the joint error has already calculated, the second output pulse signals output from the output encoder portion 42 need only be counted in the subsequent processes to directly detect the joint angle.

In the second control step as step S45, a pause mode of pausing calculation processes of portions associated with joint error calculations such as the joint phase calculating portion 242, a reference phase calculating portion 248, and a joint error calculating portion 249 is set at the same time. By setting the pause mode in this way, the calculation processes of the CPU 201 to be used can be reduced.

According to the second embodiment, the calculation processes of the CPU 201 after the joint error calculation are reduced. The second embodiment is particularly effective when the joint rotates at high speed.

[Third Embodiment]

Figure 16:
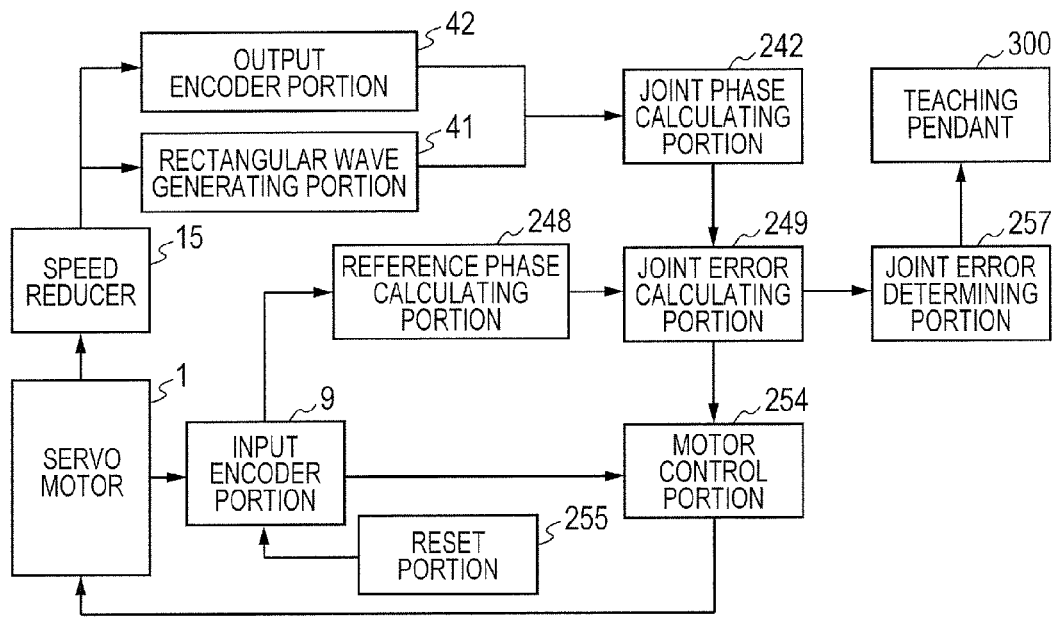
FIG. 16 is a functional block diagram showing a control system of a robot apparatus according to the third embodiment.

A robot apparatus according to the third embodiment of the present invention will be described below. FIG. 16 is a functional block diagram showing a control system of the robot apparatus according to the third embodiment of the present invention. Note that the same reference numerals in the third embodiment denote the same components as in the first embodiment, and a description thereof will not be repeated. In the third embodiment, the apparatus arrangement is the same as that of the first embodiment, and control operations of a CPU 201 in a control apparatus 200 shown in FIG. 4, that is, the contents of a program 330 are different from the first embodiment.

When a power supply of a robot arm is turned off for a predetermined period of time, and is then turned on again, a calculated joint error often becomes volatile or indefinite. The robot arm may be manually moved while its power supply is OFF. For this reason, the joint error stored in the robot arm immediately after power-ON from a power-OFF state cannot be used.

That is, when the power supply is turned off, and is then turned on, if a joint does not rotate before an edge of pulse signals of a rectangular wave generating portion 41 is detected, control in a state free from any joint error is to be executed. For example, assume that a state of an estimated joint angle R is set in FIG. 11. A joint error θ cannot be detected unless the joint rotates and an edge tg1 or tg2 is detected.

Thus, in the third embodiment, the CPU 201 (FIG. 4) further has a function of a joint error determining portion 257 which determines whether or not a joint error calculation is terminated, in addition to respective portions of the first embodiment.

Then, in the third embodiment, a teaching pendant 300 functions as an informing portion which can inform the user of a state. This teaching pendant 300 notifies the user of a joint error calculation state.

Figure 17:
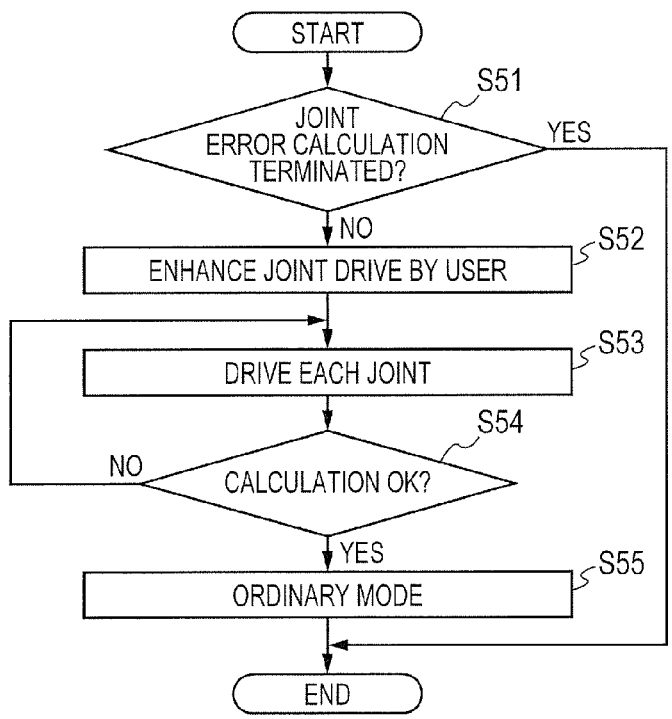
FIG. 17 is a flowchart showing a joint angle control operation of a CPU according to the third embodiment.

FIG. 17 is a flowchart showing a joint angle control operation of the CPU according to the third embodiment. Note that respective process steps shown in FIG. 17 are executed when the CPU 201 (FIG. 4) reads out the program 330 and executes the program 330.

After power-ON, the CPU 201 functions as the joint error determining portion 257 first. That is, the CPU 201 executes a determining process for determining whether or not an edge of first output pulse signals from the rectangular wave generating portion 41 is detected from the beginning of an operation of a servo motor 1 by a first control process described in the first embodiment until the end of the operation (step S51).

If the CPU 201 determines in the determining process of step S51 that the edge of the first output pulse signals is not detected (NO in step S51), it executes an informing process for activating the teaching pendant 300 as an informing portion so as to enhance joint drive by the user (step S52). For example, a message is displayed on a display portion of the teaching pendant 300. Alternatively, an audible message or buzzer tone may be output.

When the user operates the teaching pendant 300, the CPU 201 drives each joint (step S53).

The CPU 201 then determines whether or not the joint error calculation is terminated, that is, calculation OK (step S54). If the joint error calculation is not terminated yet (NO in step S54), the CPU 201 waits until the calculation is terminated. If the joint error calculation is terminated (YES in step S54), the CPU 201 transits to an ordinary mode (step S55), and operates in the same manner as in the first embodiment. If the process is complete, the CPU 201 ends the process.

As described above, according to the third embodiment, since the teaching pendant 300 can function as an informing portion which notifies the user of an invalid message, the user can be informed of whether or not a joint error is valid, thus improving the convenience. Note that as the informing portion, a display device, audio output device, light output device, or the like may be used in place of the teaching pendant 300.

[Fourth Embodiment]

Figure 18:
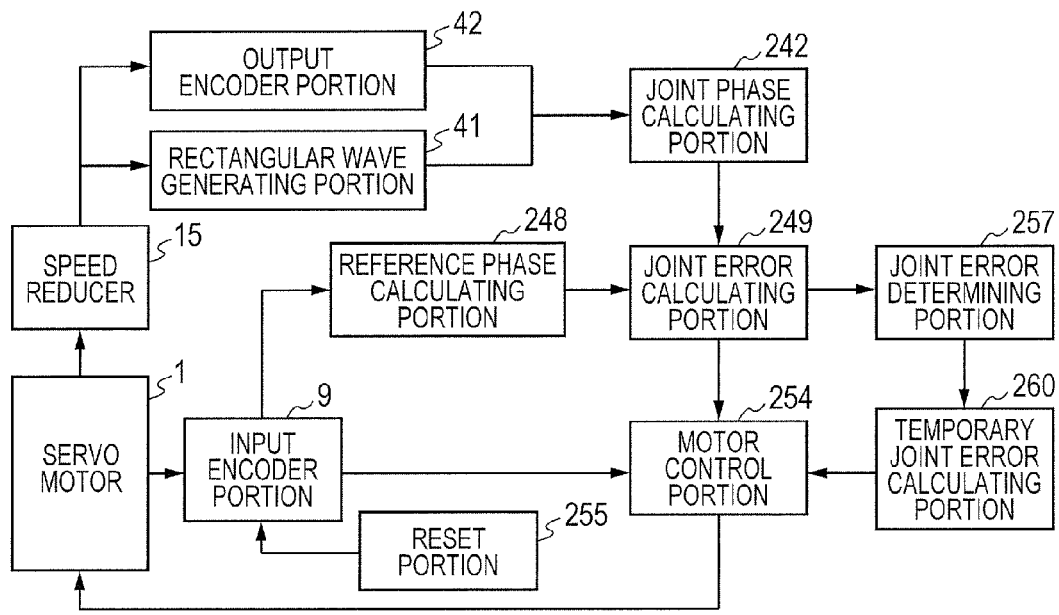
FIG. 18 is a functional block diagram showing a control system of a robot apparatus according to the fourth embodiment.

A robot apparatus according to the fourth embodiment of the present invention will be described below. FIG. 18 is a functional block diagram showing a control system of the robot apparatus according to the fourth embodiment of the present invention. Note that the same reference numerals in the fourth embodiment denote the same components as in the first embodiment, and a description thereof will not be repeated. In the fourth embodiment, the apparatus arrangement is the same as that of the first embodiment, and control operations of a CPU 201 in a control apparatus 200 shown in FIG. 4, that is, the contents of a program 330 are different from the first embodiment.

In the fourth embodiment, the CPU 201 (FIG. 4) further has a function of a joint error determining portion 257 which determines whether or not a joint error calculation is terminated, in addition to respective portions of the first embodiment. Also, the CPU 201 (FIG. 4) further has a function of a temporary joint error calculating portion 260 which calculates a temporary joint error from information of a posture of a robot arm and the like when a calculation value of a joint error is indefinite, in addition to respective portions of the first embodiment.

Figure 19:
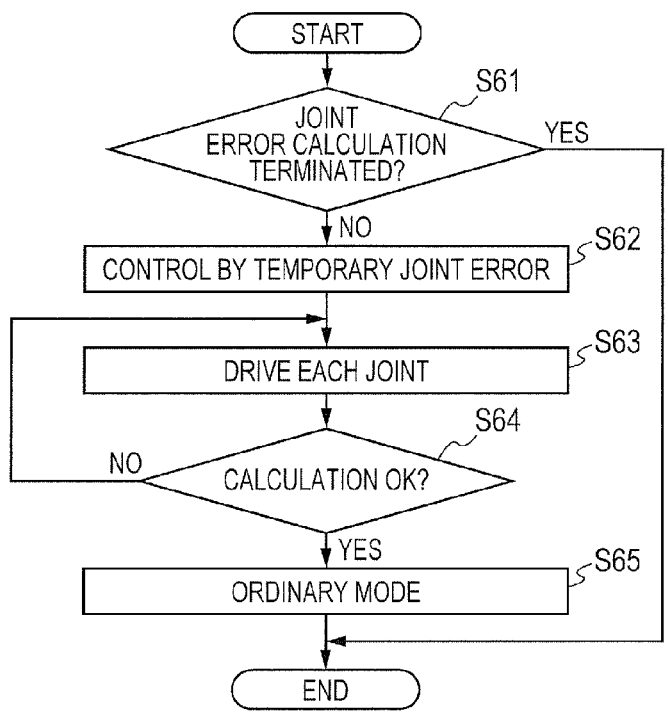
FIG. 19 is a flowchart showing a joint angle control operation of a CPU according to the fourth embodiment.

FIG. 19 is a flowchart showing a joint angle control operation of the CPU according to the fourth embodiment. Note that respective process steps shown in FIG. 19 are executed when the CPU 201 (FIG. 4) reads out the program 330 and executes the program 330.

After power-ON, the CPU 201 functions as the joint error determining portion 257. That is, the CPU 201 executes a determining process for determining whether or not an edge of first output pulse signals from the rectangular wave generating portion 41 is detected from the beginning of an operation of a servo motor 1 by a first control process described in the first embodiment until the end of the operation (step S61).

Next, the CPU 201 functions as the temporary joint error calculating portion 260. That is, if the CPU 201 determines in the determining process of step S61 that the edge of the first output pulse signals is not detected (NO in step S61), it executes an estimation process for estimating an estimated torsion angle of the joint from a posture of a robot main body (step S62). Then, if NO is determined in step S61, the CPU 201 uses the estimated torsion angle calculated in step S62 in place of a torsion angle θ in a correction control process described in the first embodiment. That is, in step S62, by calculating a torsion angle of each joint from the posture of the robot main body in consideration of a work, hand, and the like, the estimated torsion angle (temporary joint error) is calculated, and is stored in a joint error memory unit (for example, an HDD 204 in FIG. 4). Then, the CPU 201 executes the correction control process using the estimated torsion angle (temporary joint error) in place of the torsion angle.

When the user operates a teaching pendant 300, the CPU 201 drives each joint (step S63).

Next, the CPU 201 determines whether or not the joint error calculation is terminated, that is, calculation OK (step S64). If the joint error calculation is not terminated (NO in step S64), the CPU 201 waits until the calculation is terminated. If the joint error calculation is terminated (YES in step S64), the CPU 201 transits to an ordinary mode (step S65), and operates in the same manner as in the first embodiment. If the processes are complete, the CPU 201 ends the process.

As described above, according to the fourth embodiment, since an estimated torsion angle of each joint is calculated from the posture of the robot main body, the operation of the robot main body immediately after power-ON can be stabilized.

Note that the present invention is not limited to the aforementioned embodiments, and many modifications can be made within the technical scope of the present invention by those who are skilled in the art.

The above embodiments have explained the case in which the robot main body 100A is a vertical articulated robot. Alternatively, the present invention is also applicable to a horizontal articulated robot (scalar robot), parallel link robot, and the like.

The above embodiments have explained the case in which the input encoder portion 9 is arranged on the rotating shaft 2 of the servo motor 1. Alternatively, the input encoder portion 9 may be directly arranged on the input shaft of the speed reducer 15.

When the speed reducer is a strain strain wave gearing, and a torsion of the strain strain wave gearing is dominant, since this torsion angle corresponds to a torque of each joint, torque control of the joint may be executed based on a joint error.

When the detection positions of the first detection head 33 and second detection head 34 do not match the line segment D-D described using FIG. 3, respective displacements may be stored as offset values to make shift calculations of the waveforms A and B. In the above description, a leading edge is detected as an edge. However, since the waveforms A and B have periodicity, an edge to be detected is not limited to the leading edge but a trailing edge may be detected as long as the reference of each waveform can be specified.

The respective process operations of the above embodiments are executed by the CPU 201 as the control portion of the control apparatus 200. Therefore, these process operations may be attained by supplying a recording medium which records a program required to implement the aforementioned functions to the control apparatus 200, and controlling a computer (CPU or MPU) of the control apparatus 200 to read out and execute the program stored in the recording medium. In this case, the program itself read out from the recording medium implements the functions of the aforementioned embodiment, and the program itself and the recording medium which records that program configure the present invention.

In the description of the above embodiments, a computer-readable recording medium is the HDD 204, which stores the program 330. However, the present invention is not limited to this. The program 330 may be recorded in any other recording media as long as they are readable by a computer. For example, as a recording medium used to supply the program, the ROM 202, external memory device 312, recording disk 331, and the like shown in FIG. 4 may be used. For example, as the recording medium, a flexible disk, hard disk, optical disk, magneto-optical disk, CD-ROM, CD-R, magnetic tape, nonvolatile memory card, ROM, and the like can be used.

Also, the program in the above embodiments may be downloaded via a network, and may be executed by the computer.

The present invention is not limited to the case in which the functions of the above embodiments are implemented when the computer executes a readout program code. The present invention includes a case in which an OS (Operating System) or the like, which runs on the computer, executes some or all of actual processes based on an instruction of that program code, thereby implementing the functions of the aforementioned embodiments.

Furthermore, the program code read out from the recording medium may be written in a memory included in a function extension board inserted in the computer or a function extension unit connected to the computer. The present invention also includes a case in which a CPU or the like included in the function extension board or unit executes some or all of actual processes based on the instruction of the program code, thereby implementing the functions of the aforementioned embodiments.

According to the present invention, since the rotary motor is controlled by calculating a torsion angle of each joint based on the detection result of the rectangular wave generating portion, the angle of each joint can be controlled to match a target joint angle with high precision. In addition, a compact, low-cost robot apparatus can be realized compared to the arrangement including absolute encoders.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-210917, filed on Sep. 25, 2012, which is hereby incorporated by reference herein in its entirety.

What is claimed is:

1. A robot apparatus comprising: a rotary motor;
a speed reducer configured to decelerate an output of the rotary motor;
a robot main body having a joint driven by the rotary motor via the speed reducer;
a control portion configured to control driving of the joint by the rotary motor so that an angle of the joint matches a target joint angle;
an input encoder portion arranged on an input side of the speed reducer, and configured to generate input pulse signals upon rotation of a rotating shaft of the rotary motor; and
a rectangular wave generating portion arranged on an output side of the speed reducer, and configured to generate first output pulse signals according to an angle of the joint upon driving of the joint,
wherein the control portion executes a first control process for estimating an angle of the joint in an ideal state in which the joint is free from any torsion from a rotation angle of the rotating shaft of the rotary motor indicated by the input pulse signals and a speed reduction ratio of the speed reducer, and controlling to operate the rotary motor so that an estimated joint angle matches the target joint angle,
a torsion angle calculating process for calculating a torsion angle of the joint corresponding to a deviation amount between the first output pulse signals and a pulse waveform assumed to be obtained from the rectangular wave generating portion in the ideal state, and
a correction control process for controlling to operate the rotary motor to correct the estimated joint angle by the torsion angle, the robot apparatus further comprising an incremental output encoder portion which has a resolution higher than the rectangular wave generating portions, is arranged on the output side of the speed reducer, and is configured to generate second output pulse signals upon driving of the joint, wherein the control portion executes, as the torsion angle calculating process, a first angle calculating process for calculating a first angle by counting the second output pulse signals to have an edge of the first output pulse signals as a trigger during an operation of the rotary motor by the first control process, a second angle calculating process for calculating a second angle as a remainder obtained when the estimated joint angle is divided by a pitch angle of the first output pulse signals, and a difference calculating process for calculating a difference between the first angle and the second angle as the torsion angle.

2. An apparatus according to claim 1, wherein the control portion executes a positioning process for associating a count value of the second output pulse signals when the angle of the joint is corrected by the correction control process with the target joint angle, and a second control process for controlling to operate the rotary motor based on the count value of the second output pulse signals when the angle of the joint is controlled to a next target joint angle.

3. An apparatus according to claim 1, wherein the resolution of the output encoder portion is an integer multiple of a resolution of the rectangular wave generating portion.

4. An apparatus according to claim 1, further comprising an informing unit configured to inform a user of a state, wherein the control portion executes a determining process for determining whether an edge of the first output pulse signals is detected between an operation start timing and an operation end timing of the rotary motor by the first control process, and an informing process for controlling to activate the informing unit when it is determined in the determining process that the edge of the first output pulse signals is not detected.

5. An apparatus according to claim 1, wherein the control portion executes a determining process for determining whether an edge of the first output pulse signals is detected between an operation start timing and an operation end timing of the rotary motor by the first control process, and an estimation process for estimating an estimated torsion angle of the joint from a posture of the robot main body when it is determined in the determining process that the edge of the first output pulse signals is not detected, and the correction control process uses the estimated torsion angle in place of the torsion angle when it is determined in the determining process that the edge of the first output pulse signals is not detected.

6. An apparatus according to claim 1, wherein the rectangular wave generating portion includes:

a scale on which patterns are formed at a pitch angle larger than twice of a maximum torsion angle of the joint; and a detection head which is relatively rotated upon rotation of an output shaft of the speed reducer with respect to the scale, and reads the patterns to output the first output pulse signals.

7. An apparatus according to claim 6, wherein the maximum torsion angle is a value larger than a value obtained by dividing a maximum moment acting on the joint by a torsional rigidity of the speed reducer.

8. An apparatus according to claim 6, wherein the maximum torsion angle is a value larger than a value obtained by dividing an allowable torque of the speed reducer by a torsional rigidity of the speed reducer.

9. An apparatus according to claim 1, wherein the input encoder portion is an absolute rotary encoder.

10. A robot control method for controlling a control portion of a robot apparatus, which comprises a rotary motor, a speed reducer configured to decelerate an output of the rotary motor, a robot main body having a joint driven by the rotary motor via the speed reducer, an input encoder portion arranged on an input side of the speed reducer, and configured to generate input pulse signals upon rotation of a rotating shaft of the rotary motor, and a rectangular wave generating portion arranged on an output side of the speed reducer, and configured to generate first output pulse signals according to an angle of the joint upon driving of the joint, to control driving of the joint by the rotary motor so that an angle of the joint matches a target joint angle, the method comprising:

a first control step of controlling the control portion to estimate an angle of the joint in an ideal state in which the joint is free from any torsion from a rotation angle of the rotating shaft of the rotary motor indicated by the input pulse signals and a speed reduction ratio of the speed reducer, and to control to operate the rotary motor so that an estimated joint angle matches the target joint angle;

a torsion angle calculating step of controlling the control portion to calculate a torsion angle of the joint corresponding to a deviation amount between the first output pulse signals and a pulse waveform assumed to be obtained from the rectangular wave generating portion in the ideal state; and a correction control step of controlling the control portion to control to operate the rotary motor to correct the estimated joint angle by the torsion angle, wherein the robot apparatus further comprises an incremental output encoder portion which has a resolution higher than the rectangular wave generating portions, is arranged on the output side of the speed reducer, and is configured to generate second output pulse signals upon driving of the joint, and the torsion angle calculating step comprises: a first angle calculating step of controlling the control portion to calculate a first angle by counting the second output pulse signals to have an edge of the first output pulse signals as a trigger during an operation of the rotary motor in the first control step;

a second angle calculating step of controlling the control portion to calculate a second angle as a remainder obtained when the estimated joint angle is divided by a pitch angle of the first output pulse signals; and a difference calculating step of controlling the control portion to calculate a difference between the first angle and the second angle as the torsion angle.

11. A method according to claim 10, further comprising:

a positioning step of controlling the control portion to associate a count value of the second output pulse signals when the angle of the joint is corrected by the correction control process with the target joint angle, and a second control step of controlling the control portion to control to operate the rotary motor based on the count value of the second output pulse signals when the angle of the joint is controlled to a next target joint angle.

12. A program for controlling a computer to execute respective steps of a robot control method according to claim 10.

13. A non-transitory computer-readable recording medium recording a program according to claim 12.

* * * * *